(12) United States Patent
Golov et al.

(10) Patent No.: US 11,836,985 B2
(45) Date of Patent: *Dec. 5, 2023

(54) IDENTIFYING SUSPICIOUS ENTITIES USING AUTONOMOUS VEHICLES

(71) Applicant: Micron Technology, Inc., Boise, ID (US)

(72) Inventors: Gil Golov, Backnang (DE); Zoltan Szubbocsev, Haimhausen (DE)

(73) Assignee: Lodestar Licensing Group LLC, Evanston, IL (US)

( * ) Notice: Subject to any disclaimer, the term of this patent is extended or adjusted under 35 U.S.C. 154(b) by 497 days.

This patent is subject to a terminal disclaimer.

(21) Appl. No.: 17/001,546

(22) Filed: Aug. 24, 2020

(65) Prior Publication Data
US 2020/0387722 A1 Dec. 10, 2020

Related U.S. Application Data

(63) Continuation of application No. 15/882,168, filed on Jan. 29, 2018, now Pat. No. 10,755,111.

(51) Int. Cl.
| | | |
|---|---|---|
| *G06V 20/00* | (2022.01) | |
| *G06V 20/56* | (2022.01) | |
| *G05D 1/00* | (2006.01) | |
| *G06N 3/04* | (2023.01) | |
| *G05D 1/02* | (2020.01) | |
| *G06V 20/58* | (2022.01) | |
| *G06V 20/62* | (2022.01) | |

(52) U.S. Cl.
CPC ........... *G06V 20/56* (2022.01); *G05D 1/0088* (2013.01); *G05D 1/0291* (2013.01); *G06N 3/04* (2013.01); *G06V 20/58* (2022.01); *G06V 20/63* (2022.01)

(58) Field of Classification Search
CPC ........ G06V 20/56; G06V 20/58; G06V 20/63; G05D 1/0088; G05D 1/0291; G06N 3/04
USPC ............................................................ 701/26
See application file for complete search history.

(56) References Cited

U.S. PATENT DOCUMENTS

| | | |
|---|---|---|
| 8,185,296 B2 | 5/2012 | Yokoyama et al. |
| 8,442,791 B2 | 5/2013 | Stählin |
| 8,543,320 B2 | 9/2013 | Zheng et al. |
| 8,688,369 B2 | 4/2014 | Denaro |
| 8,825,371 B2 | 9/2014 | Prokhorov et al. |

(Continued)

OTHER PUBLICATIONS

International Search Report and Written Opinion, PCT/US2019/025112, dated Jul. 19, 2019.

*Primary Examiner* — Mahmoud S Ismail
(74) *Attorney, Agent, or Firm* — Greenberg Traurig

(57) ABSTRACT

Systems and methods for identifying suspicious entities using autonomous vehicles are disclosed. In one embodiment, a method is disclosed comprising identifying a suspect vehicle using at least one digital camera equipped on an autonomous vehicle; identifying a set of candidate autonomous vehicles; enabling, on each of the candidate autonomous vehicles, a search routine, the search routine instructing each respective autonomous vehicle to coordinate tracking of the suspect vehicle; recording, while tracking the suspect vehicle, a plurality of images of the suspect vehicle; periodically re-calibrating the search routines executed by the autonomous vehicles based on the plurality of images; and re-routing the autonomous vehicles based on the re-calibrated search routines.

20 Claims, 5 Drawing Sheets

(56) References Cited

U.S. PATENT DOCUMENTS

| | | |
|---|---|---|
| 9,043,127 B2 | 5/2015 | Denaro |
| 9,062,977 B2 | 6/2015 | Prokhorov et al. |
| 9,221,461 B2 | 12/2015 | Ferguson et al. |
| 9,279,688 B2 | 3/2016 | Denaro |
| 9,296,299 B2 | 3/2016 | Ricci |
| 9,754,501 B2 | 9/2017 | Stenneth |
| 9,786,172 B2 | 10/2017 | Takahara et al. |
| 9,797,735 B2 | 10/2017 | Denaro |
| 9,805,601 B1 | 10/2017 | Fields et al. |
| 9,961,551 B2 | 5/2018 | Scholl et al. |
| 10,031,523 B2 | 7/2018 | Ricci et al. |
| 10,049,328 B2 | 8/2018 | Jiang et al. |
| 10,068,477 B2 | 9/2018 | Miller et al. |
| 10,099,697 B2 | 10/2018 | Tatourian et al. |
| 10,139,831 B2 | 11/2018 | Yan |
| 10,179,586 B2 | 1/2019 | Johnson |
| 10,215,571 B2 | 2/2019 | Ghadiok et al. |
| 10,223,380 B2 | 3/2019 | Giurgiu et al. |
| 10,257,270 B2 | 4/2019 | Cohn et al. |
| 10,269,242 B2 | 4/2019 | Ahmad et al. |
| 10,298,741 B2 | 5/2019 | Goren et al. |
| 10,311,728 B2 | 6/2019 | Stenneth et al. |
| 10,331,141 B2 | 6/2019 | Grimm et al. |
| 10,345,110 B2 | 7/2019 | Westover et al. |
| 10,460,394 B2 | 10/2019 | Perl et al. |
| 10,518,720 B2 | 12/2019 | Haque |
| 10,529,231 B2 | 1/2020 | Scofield |
| 10,543,853 B2 | 1/2020 | Toyoda et al. |
| 10,648,818 B2 | 5/2020 | Denaro |
| 10,755,111 B2 | 8/2020 | Golov et al. |
| 2008/0189040 A1 | 8/2008 | Nasu et al. |
| 2011/0302214 A1 | 12/2011 | Frye et al. |
| 2012/0296560 A1 | 11/2012 | Zheng et al. |
| 2014/0067187 A1 | 3/2014 | Ferguson et al. |
| 2014/0172290 A1 | 6/2014 | Prokhorov et al. |
| 2015/0039365 A1 | 2/2015 | Haque |
| 2015/0057838 A1 | 2/2015 | Scholl et al. |
| 2016/0150070 A1 | 5/2016 | Goren et al. |
| 2016/0176440 A1 | 6/2016 | Witte et al. |
| 2016/0280224 A1 | 9/2016 | Tatourian et al. |
| 2016/0351050 A1 | 12/2016 | Takahara et al. |
| 2016/0363935 A1 | 12/2016 | Shuster et al. |
| 2017/0015318 A1 | 1/2017 | Scofield et al. |
| 2017/0277716 A1 | 9/2017 | Giurgiu et al. |
| 2017/0310747 A1 | 10/2017 | Cohn et al. |
| 2017/0316691 A1 | 11/2017 | Miller et al. |
| 2017/0372431 A1 | 12/2017 | Perl et al. |
| 2018/0004223 A1 | 1/2018 | Baldwin |
| 2018/0018869 A1* | 1/2018 | Ahmad ............... G06V 20/63 |
| 2018/0038698 A1 | 2/2018 | Denaro |
| 2018/0047285 A1 | 2/2018 | Johnson |
| 2018/0050800 A1* | 2/2018 | Boykin ............... G10L 25/51 |
| 2019/0009794 A1 | 1/2019 | Toyoda et al. |
| 2019/0047584 A1 | 2/2019 | Donnelly |
| 2019/0049257 A1 | 2/2019 | Westover et al. |
| 2019/0051172 A1 | 2/2019 | Stenneth et al. |
| 2019/0064843 A1 | 2/2019 | Matsui et al. |
| 2019/0077413 A1 | 3/2019 | Kondo et al. |
| 2019/0147252 A1* | 5/2019 | Sawada ............... G08B 21/22 |
| | | 348/148 |
| 2019/0236379 A1 | 8/2019 | Golov et al. |
| 2019/0286133 A1 | 9/2019 | Bielby |
| 2019/0287392 A1 | 9/2019 | Bielby |
| 2019/0300017 A1 | 10/2019 | Glaser et al. |
| 2019/0316913 A1 | 10/2019 | Golov |
| 2019/0382029 A1 | 12/2019 | Golov |
| 2020/0039508 A1* | 2/2020 | Onishi ............... B60W 50/14 |

* cited by examiner

IDENTIFYING SUSPICIOUS ENTITIES USING AUTONOMOUS VEHICLES

CROSS REFERENCE TO RELATED MATTERS

The present application is a continuation application of U.S. patent application Ser. No. 15/882,168, filed Jan. 29, 2018, issued as U.S. Pat. No. 10,755,111 on Aug. 25, 2020, and entitled "Identifying Suspicious Entities Using Autonomous Vehicles", the entire disclosure of which application is hereby incorporated herein by reference.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward autonomous vehicles and, in particular, to systems and methods for identifying and tracking suspect vehicles using a fleet of autonomous vehicles.

Current, non-technical solutions for identifying and tracking suspect vehicles generally rely on human cooperation and tactics. For example, law enforcement receives identifications of suspect vehicles (e.g., license plate numbers, makes and models of vehicles, etc.) and manually attempt to locate vehicles based on imperfect information such as witness testimony.

Current technical solutions attempt to supplement previous pre-computing techniques by supplementing law enforcement with a variety of data. For example, automated toll plazas are configured to capture images of license plates as these vehicles pass through automated toll plazas. Additionally, closed-circuit television (CCTV) may be utilized to inspect areas where suspect vehicles are reported. Law enforcement frequently combines these two technologies to reduce the amount of manpower and man hours needed to locate and detain a suspect vehicle.

These systems notably are incomplete. Specifically, the systems do not fully close the loop of providing an entirely automated and computerized system. Specifically, the use of existing technology to roughly identify vehicles may often produce unreliable results due to limitations of, for example, toll plaza-based imaging systems. Further, these systems may be thwarted by suspects by simply not using, for example, toll plazas. Further, the use of CCTV necessarily relies on an initial location of a suspect vehicle and additionally relies on human operators to inspect images to identify vehicles. These deficiencies result in, as an example, the average car theft recovery rate being below fifty percent in the United States on average.

Thus, there exists a need to improve existing systems and methods of identifying and tracking suspect vehicles.

SUMMARY

The disclosed embodiments solve the above-identified problems by uniquely leveraging the sensors of autonomous vehicles to provide automated identification and tracking of suspect vehicles.

The disclosed embodiments describe new techniques to utilize autonomous vehicles to identify suspect vehicles. As used herein a suspect vehicle refers to a vehicle that is of interest to authorities. For example, a suspect vehicle may include a stolen vehicle, a vehicle involved in a collision, or a vehicle in violation of a law (e.g., with an expired inspection certificate). In contrast to the existing technology described above, the disclosed embodiments utilize cameras installed on a fleet of autonomous vehicles to continuous scan the surrounding environment to identify potential suspect vehicles. The disclosed embodiments utilize machine learning techniques to first identify vehicles (e.g., by license plate numbers) and then classify the vehicles as potentially suspect (e.g., based on driving patterns, using external databases, etc.).

In a second aspect, the disclosed embodiments describe techniques for controlling a fleet of autonomous vehicles in response to determining that suspect vehicle has positively been identified. Specifically, the disclosed embodiments describe techniques for coordinating driving patterns of autonomous vehicles without substantially deviating from existing routing of the autonomous vehicles. The disclosed embodiments describe techniques for coordinate "hand offs" between autonomous vehicles in order to continuous track a suspect vehicle. Finally, the disclosed embodiments describe techniques for detaining a suspect vehicle with little or no human interaction required.

In one embodiment, a method is disclosed comprising identifying a suspect vehicle using at least one digital camera equipped on an autonomous vehicle; identifying a set of candidate autonomous vehicles; enabling, on each of the candidate autonomous vehicles, a search routine, the search routine instructing each respective autonomous vehicle to coordinate tracking of the suspect vehicle; recording, while tracking the suspect vehicle, a plurality of images of the suspect vehicle; periodically re-calibrating the search routines executed by the autonomous vehicles based on the plurality of images; and re-routing the autonomous vehicles based on the re-calibrated search routines.

In another embodiment, an autonomous vehicle is disclosed comprising at least one digital camera; a processor; and a storage medium for tangibly storing thereon program logic for execution by the processor, the stored program logic comprising: logic, executed by the processor, for identifying a suspect vehicle using the least one digital camera; logic, executed by the processor, for receiving a search routine from a central server, the search routine instructing each respective autonomous vehicle to coordinate tracking of the suspect vehicle; logic, executed by the processor, for executing the search routine; logic, executed by the processor, for recording, while tracking the suspect vehicle, a plurality of images of the suspect vehicle; logic, executed by the processor, for periodically receiving a re-calibrated search routine based on the plurality of images; and logic, executed by the processor, for re-routing the autonomous vehicle based on the re-calibrated search routine.

In another embodiment, a server-side device is disclosed comprising a processor; and a storage medium for tangibly storing thereon program logic for execution by the processor, the stored program logic comprising: logic, executed by the processor, for identifying a suspect vehicle using images captured by at least one digital camera equipped on an autonomous vehicle; logic, executed by the processor, for identifying a set of candidate autonomous vehicles; logic, executed by the processor, for transmitting, to each of the candidate autonomous vehicles, a search routine, the search routine instructing each respective autonomous vehicle to coordinate tracking of the suspect vehicle; logic, executed by the processor, for receiving a plurality of images recorded by the candidate autonomous vehicles while tracking the suspect vehicle; logic, executed by the processor, for periodically re-calibrating the search routines executed by the autonomous vehicles based on the plurality of images; and logic, executed by the processor, for transmitting re-routing information to the autonomous vehicles based on the re-calibrated search routines.

The following detailed description describes the specific technical implementations of these operations.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
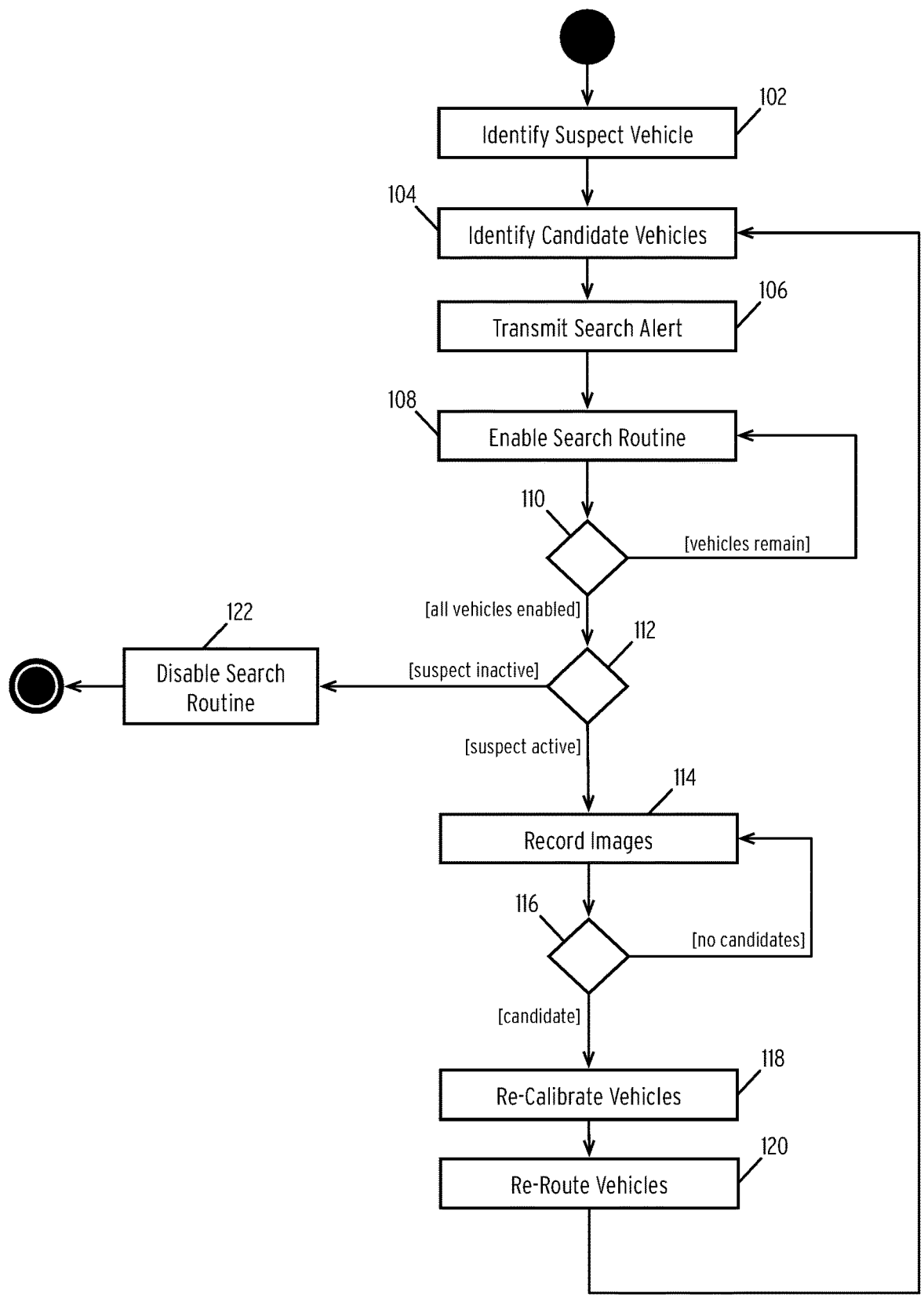
FIG. 1 is a flow diagram illustrating a method for identifying and tracking a suspect vehicle according to some embodiments of the disclosure.

FIG. 1 is a flow diagram illustrating a method for identifying and tracking a suspect vehicle according to some embodiments of the disclosure.

In step 102, the method identifies a suspect vehicle. Specific details of step 102 are described in more detail in the description of FIG. 2, incorporated herein by reference in its entirety.

In one embodiment, step 102 may include utilize pre-existing technical solutions to identify suspect vehicles. For example, the method in step 102 may receive a license plate number, make/model, color, or other identifying aspect of a suspect vehicle. In some embodiments, step 102 may include receiving a last recorded location of a suspect vehicle (e.g., captured via a toll plaza scanner).

In addition to utilizing these existing systems, the method utilizes a fleet of autonomous vehicles to further refine and identify a suspect vehicle. Generally, each autonomous vehicle in a fleet of autonomous vehicles includes multiple sensors such as digital cameras for recording images of the environment surrounding an autonomous vehicle. In one embodiment, the method transmits an identification of a suspect vehicle. This transmittal causes the autonomous vehicles to monitor the recorded images to determine if the identified vehicle is within the image capture region of an autonomous vehicle.

In one embodiment, the method utilizes digital cameras on an autonomous vehicle to determine if a license plate number (either partial or full) appears within at least one image captured by the digital camera. In some embodiments, each autonomous vehicle may utilize one or more deep neural networks (DNNs) to identify alphanumeric characters in an image. Alternatively, or in conjunction with the foregoing, these DNNs may be configured to distinguish between alphanumeric symbols appearing in, for example, road signs, and alphanumeric characters appearing in license plates.

Alternatively, or in conjunction with the foregoing, step 102 may include analyzing digital camera images to identify vehicles matching a make, model, color, or other visual attribute of a suspect image. In one embodiment, the autonomous vehicles include multiple DNNs for classifying images into these corresponding visual attributes.

In one embodiment, the DNNs used to classify suspect vehicles may be trained using past images, videos, or sensor data associated with suspect vehicles. For example, video data of previous suspect vehicles may be used to train the DNNs to predict the likelihood of a vehicle comprising a suspect vehicle. In some embodiments, these videos may be obtained from public sources and may, optionally, be supplemented by law enforcement video. Alternatively, or in conjunction with the foregoing, the DNNs may be trained using simulated suspect vehicle data. For example, in some embodiments, a video game simulation (e.g., using the popular GRAND THEFT AUTO series of games) may be used to train a DNN to predict erratic driving or other characteristics of a suspect driver.

In an alternative embodiment, the method may identify a suspect vehicle based on characteristics of a vehicle recording using one or more autonomous vehicle sensors. For example, the method may utilize cameras, radar, Lidar, etc. sensors to determine what a vehicle is operating erratically. The method may then transmit an identification of the vehicle to a central server to determine whether the erratic vehicle is, in fact, a suspect vehicle.

In step 104, the method identifies one or more candidate vehicles. Specific details of step 104 are described in more detail in the description of FIG. 3, incorporated herein by reference in its entirety.

In one embodiment, a vehicle identified in step 102 may be associated with a known location or known, "last seen" geographic area. In this embodiment, the method may identify a set of autonomous vehicles with a predefined distance of the last known location or region of the suspect vehicle. In some embodiments, each autonomous vehicle may periodically communicate its location to a central server. The central server may then be able to identify a listing of vehicles within a predefined radius of a given location (i.e., the last known location of the suspect vehicle).

In some embodiments, the method may further predict a future route of the suspect vehicle based on one or more data points associated with the suspect vehicle. In one embodiment, the method may have received multiple identifications of the suspect vehicle from other autonomous vehicles. In this embodiment, the method may predict the future routing of the vehicle based on the past locations. In some embodiments, the central server may utilize a set of historical suspect vehicle routes to predict a future route. For example, in some embodiments, suspect vehicles in a given geographic region may take similar routes (e.g., to evade detection or capture). In this embodiment, the past routes may be used to train a neural network or similar machine learning model in order to predict future routes of suspect vehicles.

In step 106, the method transmits a search alert.

In one embodiment, after identifying a candidate set of autonomous vehicles, a central server transmits a signal to each identified autonomous vehicle to direct the autonomous vehicles to begin tracking the suspect vehicle. In some embodiments, the method may utilize a secure transmission channel in order to communicate the search alert. In some embodiments, the search alert includes details of the suspect vehicle such as a license plate number, make, model, color, speed, last known location, predicted route, unique autonomous vehicle identification number, or other identifying information.

In step 108, the method enables a search routine.

In one embodiment, each autonomous vehicle may be equipped with a search routine. In other embodiments, the search routine may comprise executable code or defined rules transmitted by the central server to each autonomous vehicle. In either embodiment, the search routine defines the operating characteristics of the automobile while performing a search as well as the conditions for tracking a vehicle.

In one embodiment, the search routine specifies the maximum time to spend tracking a vehicle. In this embodiment, the search routine causes the autonomous vehicle to perform the subsequent steps for a time-delimited period before relinquishing control of the autonomous vehicle. In some embodiments, this period may defined by the owner or operator of the autonomous vehicle. In some embodiments, it may be specific as a function of a vehicle status (e.g., fuel/energy level).

In one embodiment, the search routine specifies the maximum deviation from an existing route. In this embodiment, a given autonomous vehicle may be configured to execute a defined driving routing along a pre-defined route. In one embodiment, the search routine specifies how far the autonomous vehicle may deviate from the existing route. For example, the deviation may specify that an autonomous vehicle should not deviate at all from the route but should only monitor a suspect vehicle so long as the suspect vehicle remains on the pre-defined route. In this manner, the method "hands off" monitor to other autonomous vehicles resulting in minimal deviations or no deviations from the fleets routing. Alternatively, or in conjunction with the foregoing, the search routine may specify that an autonomous vehicle may only deviate from its predefined route by a set distance. For example, if the autonomous vehicle under control is driving on city streets, the method may indicate that the autonomous vehicle may deviate by a distance roughly equal to a city block.

In one embodiment, the search routine specifies a level of adherence to traffic rules. In many circumstances, a suspect vehicle may not adhere to traffic rules. However, the method balances the lawlessness of the suspect vehicle with the dangers posed by having multiple vehicles disobeying traffic laws. In one embodiment, the search routine specifies that an autonomous vehicle should adhere to all traffic rules. In this embodiment, as above, the method may compensate for adhering to rules by handing off monitoring duties to other autonomous vehicles. In other embodiments, the search routine that an autonomous vehicle should deviate from traffic rules only when safe to do so. In this embodiment, the autonomous vehicle utilizes one or more sensors to confirm that violating a traffic rule (e.g., running a stop sign or red light) can be performed without causing harm to property or injury to pedestrians. For example, the search routine may specify that an autonomous vehicle should continue pursuit of a suspect vehicle and disobey a traffic rule only if there are no obstacles within a predefined distance of the autonomous vehicle (as measured by, for example, Lidar or radar sensors).

In one embodiment, the search routine specifies a proximity threshold representing the closest distance an autonomous vehicle may be to a suspect vehicle. In this embodiment, the search routine includes instructions dictating how close an autonomous vehicle can be to a suspect vehicle. In some embodiments, the search routine monitors the various autonomous vehicle sensors (e.g., radar/sonar sensors) to regulate the distance between the autonomous vehicle and the suspect vehicle.

In one embodiment, the search routine specifies a pattern to be formed with other autonomous vehicles. In one embodiment, the pattern includes not only coordinate information but speed information as well. In this embodiment, the search routine may be configured to cause the autonomous vehicle to communicate with one or more other autonomous vehicles also executing their own search routines. In this manner, the autonomous vehicles executing the search routine may coordinate movements in order to form a pattern. In one embodiment, this pattern may comprise an arraignment of the autonomous vehicles designed to slow or stop the suspect vehicle (e.g., by "boxing" the suspect vehicle or forming a line across a roadway). In one embodiment, the search routine also includes speed and/or timing profiles to synchronize the speed of the autonomous vehicles. For example, when forming a "boxing" pattern, each autonomous vehicle may slow down in synchrony to stop the suspect vehicle.

In one embodiment, the search routine specifies emergency contact information. In this embodiment, the autonomous vehicle may execute the search routine and periodically communication with law enforcement or other emergency services to update authorities on the position of the suspect vehicle. In some embodiments, the search routine may allow law enforcement to disable the search routine upon interception by law enforcement personnel.

In step 110, the method determines if any identified autonomous vehicles remain and if so continues to enable search routines on each identified autonomous vehicle (step 108).

In step 112, the method determines if the suspect vehicle is still active.

In one embodiment, a suspect vehicle is still active if the vehicle is, for example, still in motion. In some embodiments, a suspect vehicle may be active until a signal is transmitted to the autonomous vehicles indicating that the suspect vehicle is inactive (e.g., in the event of a false positive identification or other law enforcement determination).

In step 114, the method records images while the suspect vehicle is active. In one embodiment, in step 114, the method (e.g., as part of the search routine) accesses images recorded by one or more digital cameras installed on a given autonomous vehicle.

In step 116, the method determines if a recorded image includes a candidate.

In one embodiment, the candidate comprises an image of the suspect vehicle. In one embodiment, in step 116, the method uses information transmitted by the central server to determine if a candidate is located in a recorded image. This information may include a license plate number, make, model, color, speed, last known location, predicted route, unique autonomous vehicle identification number, or other identifying information. In one embodiment, in step 116, the method uses one or more image classifiers or deep neural networks to determine if a given image contains the identifying information.

In step 118, the method re-calibrates vehicles in response to detecting the suspect vehicle. Specific details of step 118 are described in more detail in the description of FIGS. 2 and 3, incorporated herein by reference in its entirety.

In one embodiment, the detection of a suspect vehicle enables the detecting autonomous vehicle to transmit identifying information to a central server including, for example, the current location of the autonomous vehicle and the current location of the suspect vehicle. In one embodiment, the autonomous vehicle transmits this information to the central server and the central server may re-calibrate the search routines for each vehicle based on the current information. In one embodiment, the central server may transmit the search routine information as described previously given the update coordinates.

In step 120, the method re-routes the autonomous vehicles after re-calibrating.

As described above, the central server receives the updated location of the suspect vehicle and may then calculate new routing information for each vehicle executing the search routine. For example, some of the autonomous vehicles may have terminated the search routine upon detecting a termination event (e.g., meeting a predefined search distance). Thus, in step 120, the central server may remove these autonomous vehicles from the list of candidate autonomous vehicles and may re-route the remaining autonomous vehicles to compensate for the lost autonomous vehicles.

Additionally, in some embodiments, the method may refine a predicted route of the suspect vehicle using the updated waypoint associated with the new coordinates. In this manner, the central server may calculate a new, predicted route and transmit the routing instructions to the autonomous vehicles.

As illustrated, the method continuously executes steps 104 through 120 while the suspect vehicle is active. Thus, in step 120, the method may re-route the previously identified vehicles (identified in step 104). In some embodiments, this may comprise terminating the routing of some autonomous vehicles. Thus, in step 104, the method identifies a new set of autonomous vehicles and proceeds to re-route those vehicles.

In step 112, the method may determine that a suspect is inactive and, in step 122, disables the search routine for one or more autonomous vehicles.

As described above, in one embodiment, the method may determine that a suspect vehicle has stopped moving and the stopping of movement comprises an indication the suspect vehicle is inactive. Alternatively, a central server may explicitly transmit an indication that the suspect vehicle is inactive.

In one embodiment, the method disables the search routines for each of the autonomous vehicles currently executing the search routine. In one embodiment, this comprises terminating all pursuit operations currently executed by the autonomous vehicle. In some embodiments, the disabling may direct each autonomous vehicle to remain with the inactive suspect vehicle for a pre-determined amount of time or until instructed to depart.

Figure 2:
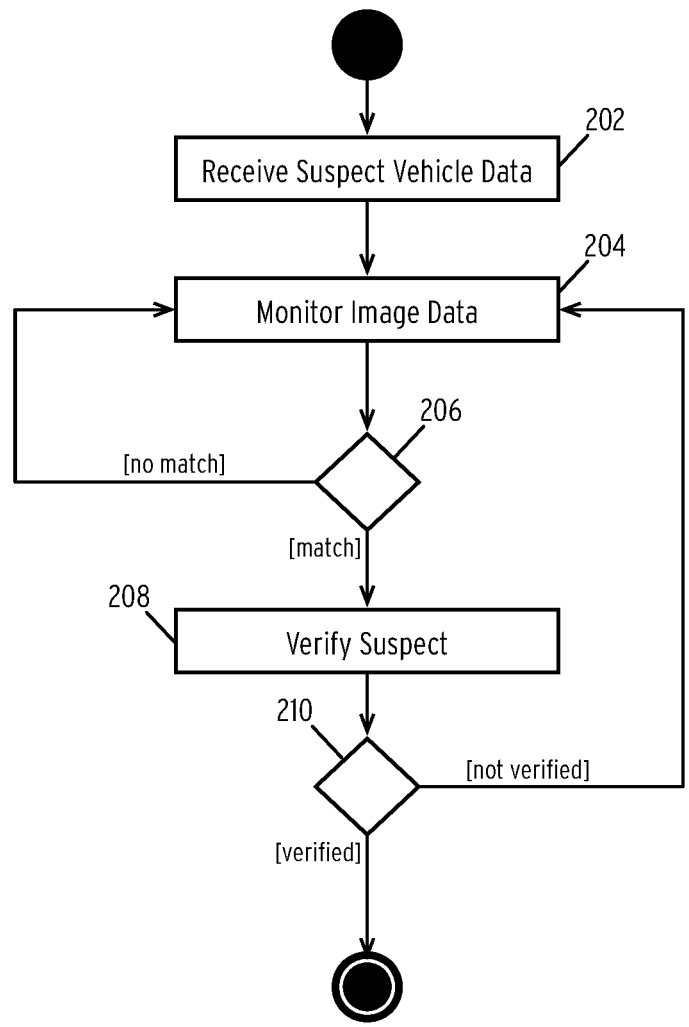
FIG. 2 is a flow diagram illustrating a method for identifying suspect vehicles according to some embodiments of the disclosure.

FIG. 2 is a flow diagram illustrating a method for identifying suspect vehicles according to some embodiments of the disclosure.

In step 202, the method receives suspect vehicle data. In some embodiments, this may comprise a license plate number, vehicle make/model, color, or other identifying information. Notably, in some embodiments, step 202 may be optional (as will be described in connection with step 206).

In step 204, the method monitors image data generated by one or more digital cameras of an autonomous vehicle. As described above, the image data may comprise image data recorded by digital cameras installed on an autonomous vehicle. In some embodiments, the image data may comprise two-dimensional or three-dimensional image data.

In step 206, the method determines if the image data matches a suspect vehicle.

In a first embodiment, the method inputs the image data into one or more machine learning models (e.g., DNNs) that classify the image to extract features matching the suspect vehicle information. For example, the autonomous vehicle may be equipped with a license plate detection model that extracts license plate data from images. In this example, the method runs the images through model to output a set of one or more license plate numbers. The method then compares these numbers to the numbers associated with the suspect vehicle received in step 202. Similar steps may be performed with models for makes, models, colors, etc.

In a second embodiment, step 202 is optional. In this embodiment, the method begins by analyzing image data recorded by digital cameras. Additionally, in this embodiment, the method may further monitor data from other sensors such as radar, sonar, Lidar, and other sensors. In this embodiment, the autonomous vehicle may be equipped with a suspect vehicle model. This model may be trained using past recorded data associated with suspect vehicles. In some embodiments, velocity and acceleration data may be weighted heavily during the training process. For example, stolen or otherwise suspect vehicles may exhibit high rates of speed and erratic movement patterns. These features may be used to train a DNN that may be utilized in step 206 to determine whether an image represented by the monitored data may be a suspect vehicle. Other models may be used. For example, images of suspect vehicles may be used to train a classifier (e.g., a DNN) to classify vehicles in images as suspect or non-suspect. For example, a vehicle with a broken driver's side window may be appropriate classified as a suspect vehicle. As another example, a DNN may be utilized to extract other aspects of the suspect vehicle. For example, a DNN may be used to extract an inspection certificate of a vehicle and classify the certificate as expired or not expired (or present or not present).

In either scenario, if the autonomous vehicle does not identify a suspect match, the method continues to monitor image and/or sensor data in step 204.

In step 208, the method verifies a suspect vehicle in response to detecting a potential match.

In one embodiment, after identifying a potential match, the method may package a suspect vehicle identification file that includes the triggering image as well as data regarding the vehicle (e.g., license plate, geographic location, make/model, color, etc.). This data may be transmitted to a central server in order to verify the autonomous vehicle's prediction. In one embodiment, the central server may employ similar models that are continuously retrained with newer data. Thus, the models at the central server may be more refined than the models at the autonomous vehicle. Alternatively, or in conjunction with the foregoing, the central server may use the vehicular data to query a database of known suspect vehicles (e.g., stolen vehicles). In some embodiments, the central server may select an appropriate data (e.g., a regional or local database) based on the current location of the autonomous vehicle recording the potential match.

If the method does not verify the suspect vehicle, the method continues to execute steps 204, 206, and 208.

Alternatively, if the method verifies the suspect vehicle, the method proceeds. As illustrated, the method may proceed to step 104 described in the description of FIG. 1.

Figure 3:
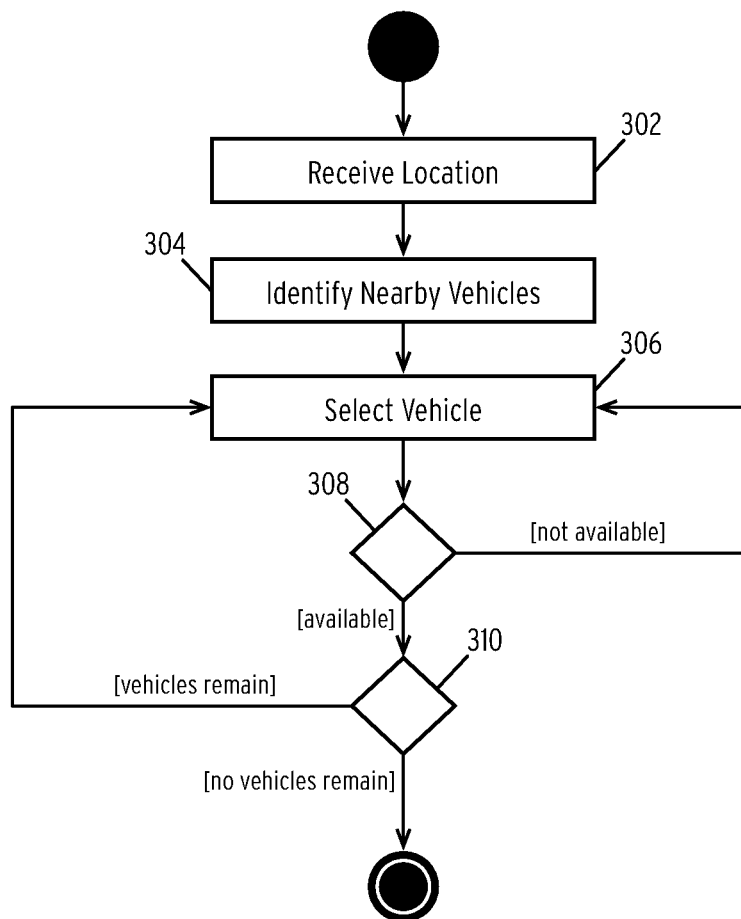
FIG. 3 is a flow diagram illustrating a method for identifying candidate autonomous vehicles according to some embodiments of the disclosure.

FIG. 3 is a flow diagram illustrating a method for identifying candidate autonomous vehicles according to some embodiments of the disclosure.

In step 302, the method receives a location of a suspect vehicle. In some embodiments, the location includes the last known geographic coordinates of the suspect vehicle as discussed previously.

In step 304, the method identifies one or more nearby vehicles.

In one embodiment, a vehicle identified in step 304 may be associated with a known location or known, "last seen" geographic area. In this embodiment, the method may identify a set of autonomous vehicles with a predefined distance of the last known location or region of the suspect vehicle. In some embodiments, each autonomous vehicle may periodically communicate its location to a central server. The central server may then be able to identify a listing of vehicles within a predefined radius of a given location (i.e., the last known location of the suspect vehicle).

In some embodiments, the method may further predict a future route of the suspect vehicle based on one or more data points associated with the suspect vehicle. In one embodiment, the method may have received multiple identifications of the suspect vehicle from other autonomous vehicles. In this embodiment, the method may predict the future routing of the vehicle based on the past locations. In some embodiments, the central server may utilize a set of historical suspect vehicle routes to predict a future route. For example, in some embodiments, suspect vehicles in a given geographic region may take similar routes (e.g., to evade detection or capture). In this embodiment, the past routes may be used to train a neural network or similar machine learning model in order to predict future routes of suspect vehicles.

In step 306, the method selects an identified autonomous vehicle.

In step 308, the method determines if the selected autonomous vehicle is available. In one embodiment, a selected autonomous vehicle is available if the selected autonomous vehicle meets one or more availability conditions. A first condition may comprise an indication of whether the autonomous vehicle has opted in to a suspect monitoring platform. A second condition may comprise whether the autonomous vehicle is currently occupied by a passenger. A third condition may comprise whether the autonomous vehicle has enough fuel or energy to assist.

In step 310, the method determines if any more autonomous vehicles remain to be analyzed and, if so, repeats steps 306-308 for each remaining vehicle.

Figure 4:
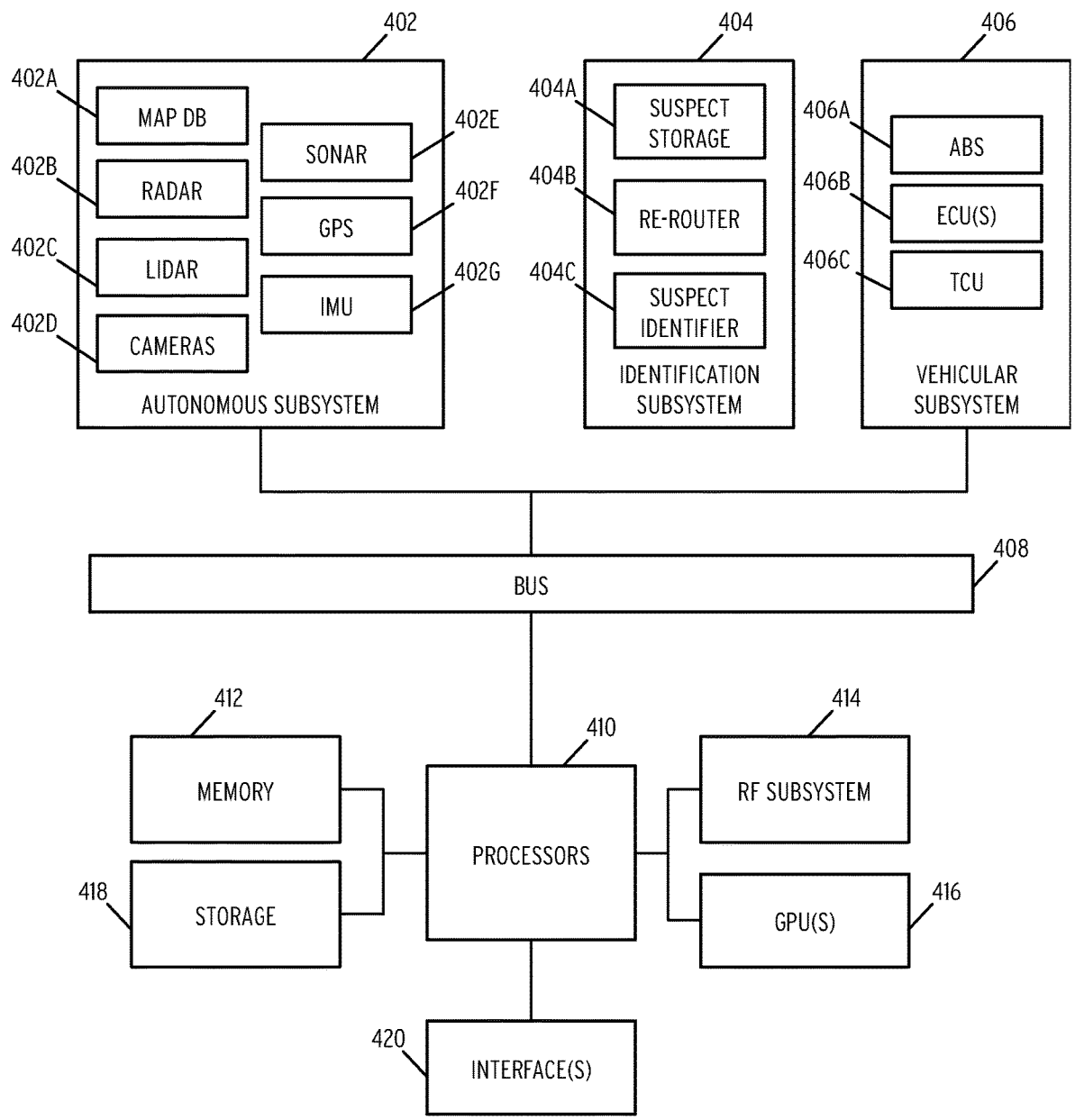
FIG. 4 is a block diagram of an autonomous vehicle according to some embodiments of the disclosure.

FIG. 4 is a block diagram of an autonomous vehicle according to some embodiments of the disclosure.

The system illustrated in FIG. 4 may be installed entirely within a vehicle. In some embodiments, some components (e.g., components and subsystems other than subsystem (404)) may comprise existing autonomous vehicle subsystems.

The system includes an autonomous vehicle subsystem (402). In the illustrated embodiment, autonomous vehicle subsystem (402) includes map database (402A), radar devices (402B), Lidar devices (402C), digital cameras (402D), sonar devices (402E), GPS receivers (402F), and inertial measurement units (402G). Each of the components of autonomous vehicle subsystem (402) comprises standard components provided in most current autonomous vehicles. In one embodiment, map database (402A) stores a plurality of high-definition three-dimensional maps used for routing and navigation. Radar devices (402B), Lidar devices (402C), digital cameras (402D), sonar devices (402E), GPS receivers (402F), and inertial measurement units (402G) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem (406) is additionally included within the system. Vehicular subsystem (406) includes various anti-lock braking systems (406A), engine control units (402B), and transmission control units (402C). These components may be utilized to control the operation of the autonomous vehicle in response to the streaming data generated by autonomous vehicle subsystem (402A). The standard autonomous vehicle interactions between autonomous vehicle subsystem (402) and vehicular subsystem (406) are generally known in the art and are not described in detail herein.

The processing side of the system includes one or more processors (410), short-term memory (412), an RF system (414), graphics processing units (GPUs) (416), long-term storage (418) and one or more interfaces (420).

The one or more processors (410) may comprise central processing units, FPGAs, or any range of processing devices needed to support the operations of the autonomous vehicle. Memory (412) comprises DRAM or other suitable volatile RAM for temporary storage of data required by processors (410). RF system (414) may comprise a cellular transceiver and/or satellite transceiver. Long-term storage (418) may comprise one or more high-capacity solid-state drives (SSDs). In general, long-term storage (418) may be utilized to store, for example, high-definition maps, routing data, and any other data requiring permanent or semi-permanent storage. GPUs (416) may comprise one or more high throughput GPU devices for processing data received from autonomous vehicle subsystem (402A). Finally, interfaces (420) may comprise various display units positioned within the autonomous vehicle (e.g., an in-dash screen).

The system additionally includes an identification subsystem (404) which performs all of the data collection and processing required by the methods illustrated in the preceding Figures. The identification subsystem (404) includes a suspect storage module (404A) which is connected to bus (408) and stores data regarding suspect vehicles. In one embodiment, suspect storage module (404A) may store details regarding suspect vehicles such as locations, makes, models, license plate numbers, routing information and various other details discussed previously.

The identification subsystem (404) additionally includes a re-router (404B). In one embodiment, re-router (404B) is configured to generating routing information based on an identified location of a suspect vehicle. In some embodiments, re-router (404B) may additionally execute some or all of the search routine discussed previously.

The identification subsystem (404) additionally includes a suspect identifier (404C). In one embodiment, the suspect identifier (404C) is configured to analyze images received from the component of the autonomous system (402). For example, suspect identifier (404C) may be configured to analyze images recorded by the cameras (402D) in order to identify suspect vehicles.

Each of the devices is connected via a bus (408). In one embodiment, the bus (408) may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 5:
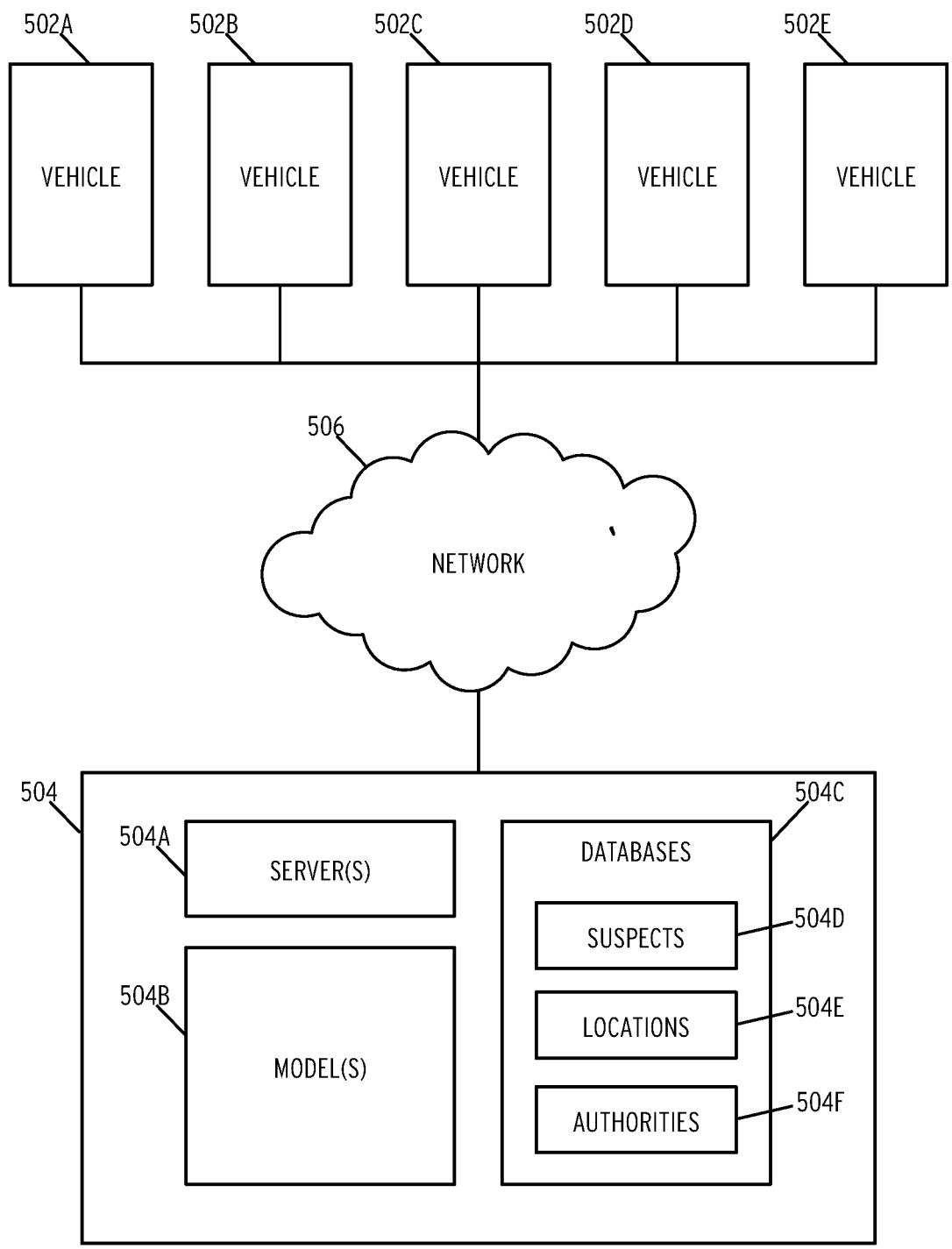
FIG. 5 is a block diagram of a centralized autonomous vehicle operations system according to some embodiments of the disclosure.

FIG. 5 is a block diagram of a centralized autonomous vehicle operations system according to some embodiments of the disclosure.

As illustrated, the system includes a number of autonomous vehicles (502A-502E). In one embodiment, each autonomous vehicle may comprise an autonomous vehicle such as that depicted in FIG. 4, the disclosure of which is incorporated herein by reference in its entirety. Each autonomous vehicle (502A-502E) may communication with a central system (504) via a network (506). In one embodiment, network (506) comprises a global network such as the Internet.

Central system (504) includes a plurality of servers (504A). In one embodiment, servers (504A) comprise a plurality of front end webserver configured to serve responses to autonomous vehicles (502A-502EE). The servers (504A) may additionally one or more application server configured to perform the operations discussed in the previous flow diagrams.

Central system (504) additionally includes a plurality of models (504B). In one embodiment, the models (504B) may be generated by the processes described previously. Specifically, models (504B) may store one or more neural networks for classifying vehicles as suspect vehicles. The models (504B) may additionally include models for predicting future routes taken by suspect vehicles as discussed previously. In some embodiments the models (504B) may store a combination of neural networks and other machine learning models discussed previously.

Central system (504) additionally includes one or more databases (504C). The databases (504C) may include database record for suspects (504D), locations (504E), and authorities (504F). In one embodiment, the suspects (504D) may include the suspect vehicle objects discussed throughout. Locations (504E) may include details regarding way points of suspect vehicles. Authorities (504F) may comprise a database of authorities grouped by location and may include contact details and other details as discussed previously. In some embodiments, databases (504C) may include more or fewer databases. For example, databases (504C) may include a database of autonomous vehicles (502A-502D) and other autonomous vehicles not illustrated in the Figure. The databases (504C) may additionally include databases to store pre-configured search routines.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving an identification of a vehicle;
   identifying an autonomous vehicle near the vehicle;
   recording, by the autonomous vehicle, an image of the vehicle; and
   re-routing the autonomous vehicle.

2. The method of claim 1, wherein re-routing the autonomous vehicle comprises terminating routing of the autonomous vehicle when an image recorded by the autonomous vehicle does not include the vehicle.

3. The method of claim 1, wherein re-routing the autonomous vehicle comprises transmitting updated routing information to the autonomous vehicle.

4. The method of claim 1, wherein receiving an identification of a vehicle comprises receiving an image captured by a digital camera installed in the autonomous vehicle and analyzing the image using a deep neural network.

5. The method of claim 4, wherein the deep neural network is trained using a video game simulation.

6. The method of claim 1, further comprising:
   identifying a new image that includes the vehicle;
   determining a location associated with an autonomous vehicle that captured the new image; and
   generating updated routing information based on the location.

7. The method of claim 1, wherein re-routing the autonomous vehicle further comprises predicting a future route of the vehicle and re-routing the autonomous vehicle based on the future route.

8. A device comprising:
   a processor; and
   a storage medium for tangibly storing thereon program logic for execution by the processor, the stored program logic comprising logic for:
   receiving an identification of a vehicle,
   identifying an autonomous vehicle near the vehicle,
   recording, by the autonomous vehicle, an image of the vehicle, and
   re-routing the autonomous vehicle.

9. The device of claim 8, wherein re-routing the autonomous vehicle comprises terminating routing of the autonomous vehicle if an image recorded by the autonomous vehicle does not include the vehicle.

10. The device of claim 8, wherein re-routing the autonomous vehicle comprises transmitting updated routing information to the autonomous vehicle.

11. The device of claim 8, wherein receiving an identification of a vehicle comprises receiving an image captured by a digital camera installed in the autonomous vehicle and analyzing the image using a deep neural network.

12. The device of claim 11, wherein the deep neural network is trained using a video game simulation.

13. The device of claim 8, the stored program logic further comprising logic for:
   identifying a new image that includes the vehicle;
   determining a location associated with an autonomous vehicle that captured the new image; and
   generating updated routing information based on the location.

14. The device of claim 8, wherein re-routing the autonomous vehicle further comprises predicting a future route of the vehicle and re-routing the autonomous vehicle based on the future route.

15. A non-transitory computer-readable storage medium for tangibly storing computer program instructions capable of being executed by a computer processor, the computer program instructions defining steps of:

receiving an identification of a vehicle;

identifying an autonomous vehicle near the vehicle;

recording, by the autonomous vehicle, an image of the vehicle; and re-routing the autonomous vehicle.

16. The non-transitory computer-readable storage medium of claim 15, wherein re-routing the autonomous vehicle comprises terminating routing of the autonomous vehicle if an image recorded by the autonomous vehicle does not include the vehicle.

17. The non-transitory computer-readable storage medium of claim 15, wherein re-routing the autonomous vehicle comprises transmitting updated routing information to the autonomous vehicle.

18. The non-transitory computer-readable storage medium of claim 15, wherein receiving an identification of a vehicle comprises receiving an image captured by a digital camera installed in the autonomous vehicle and analyzing the image using a deep neural network.

19. The non-transitory computer-readable storage medium of claim 15, wherein the computer program instructions further define the steps of:

identifying a new image that includes the vehicle;

determining a location associated with an autonomous vehicle that captured the new image; and generating updated routing information based on the location.

20. The non-transitory computer-readable storage medium of claim 15, wherein re-routing the autonomous vehicle further comprises predicting a future route of the vehicle and re-routing the autonomous vehicle based on the future route.

* * * * *